(12) United States Patent
Kusanose et al.

(10) Patent No.: US 8,541,504 B2
(45) Date of Patent: Sep. 24, 2013

(54) IMPACT ABSORBER COMPOSITION

(75) Inventors: Yasuhiro Kusanose, Tokyo (JP); Yoshifumi Araki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 862 days.

(21) Appl. No.: 12/527,782

(22) PCT Filed: Feb. 19, 2008

(86) PCT No.: PCT/JP2008/052735
§ 371 (c)(1),
(2), (4) Date: Aug. 19, 2009

(87) PCT Pub. No.: WO2008/102761
PCT Pub. Date: Aug. 28, 2008

(65) Prior Publication Data
US 2010/0068452 A1    Mar. 18, 2010

(30) Foreign Application Priority Data

Feb. 20, 2007 (JP) ................................ 2007-039103
Nov. 12, 2007 (JP) ................................ 2007-293346

(51) Int. Cl.
*C08L 53/00* (2006.01)
*C08L 9/00* (2006.01)
*C08F 236/00* (2006.01)
*C08F 36/04* (2006.01)

(52) U.S. Cl.
USPC .............. 525/98; 526/340; 524/505; 521/148

(58) Field of Classification Search
None
See application file for complete search history.

(56) References Cited

U.S. PATENT DOCUMENTS

| | | | |
|---|---|---|---|
| 3,281,383 A | 10/1966 | Zelinski et al. | |
| 4,501,857 A | 2/1985 | Kishimoto et al. | |
| 4,603,155 A | 7/1986 | Muramori et al. | |
| 4,673,714 A | 6/1987 | Kishimoto et al. | |
| 5,115,035 A | 5/1992 | Shiraki et al. | |
| 5,786,406 A * | 7/1998 | Uejyukkoku et al. | 521/50.5 |
| 6,353,056 B1 | 3/2002 | Knoll et al. | |
| 6,841,261 B2 | 1/2005 | Matsui et al. | 428/521 |
| 2003/0181584 A1 | 9/2003 | Handlin, Jr. et al. | |
| 2004/0102576 A1 | 5/2004 | Matsui et al. | 525/180 |

FOREIGN PATENT DOCUMENTS

| | | |
|---|---|---|
| CA | 1034289 | 7/1978 |
| CN | 1471546 | 1/2004 |
| JP | 36-19286 B | 10/1961 |
| JP | 42-8704 B | 4/1967 |
| JP | 43-6636 B | 3/1968 |
| JP | 43-17979 B | 7/1968 |
| JP | 46-32415 B | 9/1971 |
| JP | 48-2423 B | 1/1973 |
| JP | 48-4106 B | 2/1973 |
| JP | 49-36957 B | 10/1974 |
| JP | 51-49567 B | 12/1976 |
| JP | 56-28925 B | 7/1981 |
| JP | 59-166518 | 9/1984 |
| JP | 60-186577 A | 9/1985 |
| JP | 62-79211 A | 4/1987 |
| JP | 63-4841 B | 2/1988 |
| JP | 1-37970 B | 8/1989 |
| JP | 1-53851 B | 11/1989 |
| JP | 2-9041 B | 2/1990 |
| JP | 4-39495 B | 6/1992 |
| JP | 05-345833 A | 12/1993 |
| JP | 11-171949 | 6/1999 |
| JP | 2002-504576 A | 2/2002 |
| JP | 2003-113286 | 4/2003 |
| JP | 2003-113287 | 4/2003 |
| JP | 2003-128870 A | 5/2003 |
| JP | 2004-107519 A | 4/2004 |
| WO | WO 99/42506 | 8/1999 |

OTHER PUBLICATIONS

European Search Report dated Apr. 19, 2011.
Rheology Data Handbook, Maruzen, p. 6-9, and 54-55, 2006.
I. M. Kolthoff, et al., Determination of Polystyrene in GR-S Rubber, Journal of Polymer Science, vol. 1, No. 5, pp. 429-433, Jun. 5, 1946.

* cited by examiner

*Primary Examiner* — Sheeba Ahmed
(74) *Attorney, Agent, or Firm* — Morgan, Lewis & Bockius LLP

(57) ABSTRACT

Provided in this invention is an impact absorber composition comprising a copolymer containing an aromatic vinyl compound, wherein the peak of tan δ of the copolymer obtained from the measurement of the dynamic viscoelasticity is in the range of more than 0° C. to 20° C. or less, the value of tan δ is 0.4 or more in the whole temperature range of 5° C. to 15° C., and the value of tan δ at 15° C. is 0.5 or more.

24 Claims, No Drawings

IMPACT ABSORBER COMPOSITION

TECHNICAL FIELD

The present invention relates to an impact absorber composition which excels in both low-temperature hardening resistance and low impact resilience (impact absorption properties).

BACKGROUND ART

The impact absorbers used for shoes and such are required to meet all of such property requirements as high mechanical strength, resistance to hardening in the cold districts (low-temperature hardening resistance), low specific gravity and low impact resilience (impact absorption properties).

In recent years, resins such as polystyrene, polyethylene and ethylene-vinyl acetate copolymer, natural rubber, and elastomers such as styrene-butadiene copolymer and acrylonitrile-butadiene copolymer have been used as base polymer for the impact absorbers, but these conventional impact absorbers are not necessarily satisfactory in performance in practical use, and a variety of methods for improving their requisite properties have been proposed.

More specifically, Patent Document 1 proposes a copolymer comprising a conjugated diene and an aromatic vinyl monomer and having a tan δ peak temperature in the range of 20° C. to 40° C. as a polymer for the impact absorbing foams. In this patent document, however, no disclosure is made other than the tan δ temperature. In the Examples of Patent Document 1, there are merely disclosed the hydrogenated copolymers having a tan δ peak temperature of 0° C.

Patent Document 2 proposes a copolymer comprising a conjugated diene and an aromatic vinyl monomer and having a tan δ peak temperature of −20° C. or higher and a peak value of tan δ of 0.3 or more as a polymer for the impact absorbing foams. This document, however, discloses nothing other than the tan δ peak temperature and merely shows the hydrogenated copolymers having a tan δ peak temperature of 27° C. in the Examples.

Patent Document 3 proposes combination use of a copolymer comprising a conjugated diene and an aromatic vinyl monomer and having a tan δ peak at a temperature in the range of −20° C. to 40° C., and a copolymer comprising a conjugated diene and an aromatic vinyl monomer and having a tan δ peak at a temperature in the range of −70° C. to −20° C. as a polymer for the impact absorbing foams. In this document, however, no disclosure other than the tan δ peak temperatures is made. In the Examples of Patent Document 3, there are proposed the copolymers whose tan δ peak temperature measured at 110 Hz is 5° C. (The tan δ peak temperature at 1 Hz as calculated from the ordinary temperature-time conversion described in, for instance, Non-patent Document 1 is 0° or below).

Patent Document 4 proposes the copolymers which are controlled in distribution of aromatic vinyl monomer and whose tan δ peak temperature is specified to be from −60° C. to 0° C. as a preferred range. In this document, however, no disclosure other than the peak temperature is made.
Patent Document 1: JP-A-05-345833
Patent Document 2: JP-A-2003-128870
Patent Document 3: JP-A-2004-107519
Non-patent Document 1: Rheology Data Handbook, Maruzen, 2006.
Patent Document 4: US 2003/0181584

DISCLOSURE OF THE INVENTION

Problem to be Solved by the Invention

An object of the present invention is to provide an impact absorber composition which excels in all of the requisite properties such as light weight, low-temperature hardening resistance and low impact resilience (impact absorption properties).

Means for Solving the Problem

As a result of studies on the copolymers for solving the above problem, the present inventors found that the above problem can be solved effectively by using a copolymer whose tan δ value at a specific temperature and tan δ peak temperature are controlled to stay in the specified ranges, and this finding has led to the attainment of the present invention.

Specifically, the present invention is as follows.

[1] An impact absorber composition comprising a copolymer containing an aromatic vinyl compound, wherein a tan δ peak of the copolymer determined from a measurement of dynamic viscoelasticity (at 1 Hz) of the copolymer is in a range from more than 0° C. to 20° C. or less, a tan δ value of the copolymer is 0.4 or more in a whole temperature range of 5° C. to 15° C., and the tan δ value of the copolymer at 15° C. is 0.5 or more.

[2] The impact absorber composition according to [1] above, wherein the copolymer containing the aromatic vinyl compound is a copolymer (which may have been hydrogenated) composed principally of the aromatic vinyl compound and a conjugated diene, and/or a copolymer composed principally of the aromatic vinyl compound and alkylene.

[3] The impact absorber composition according to [1] or [2] above, wherein the tan δ peak determined from the measurement of dynamic viscoelasticity (at 1 Hz) of the copolymer containing the aromatic vinyl compound is in a temperature range of 2° C. to 15° C., and the tan δ value of the copolymer at 15° C. is 0.55 or more.

[4] The impact absorber composition according to any one of [1] to [3] above, wherein the tan δ value determined from the measurement of dynamic viscoelasticity (at 1 Hz) of the copolymer containing the aromatic vinyl compound is 0.5 or more in the whole temperature range of 5° C. to 15° C.

[5] The impact absorber composition according to any one of [1] to [4], wherein a modulus of rigidity G' at −5° C. determined from the measurement of dynamic viscoelasticity (at 1 Hz) of the copolymer containing the aromatic vinyl compound is 500 MPa or less, and the modulus of rigidity G' at 40° C. is 4 MPa or less.

[6] The impact absorber composition according to any one of [2] to [5] above, wherein a ratio of hydrogenation to the double bonds based on a pre-hydrogenation conjugated diene compound in the copolymer containing the aromatic vinyl compound is 5% or more to 97% or less.

[7] The impact absorber composition according to any one of [2] to [5] above, wherein the ratio of hydrogenation to the double bonds based on the pre-hydrogenation conjugated diene compound in the copolymer containing the aromatic vinyl compound is 10% or more to 70% or less.

[8] The impact absorber composition according to any one of [1] to [7] above, wherein a weight-average molecular weight of the copolymer containing the aromatic vinyl compound is 50,000 or more to 500,000 or less.

[9] The impact absorber composition according to any one of [1] to [8] above, wherein the copolymer containing the aromatic vinyl compound comprises at least a copolymer block composed principally of alkylene and an aromatic vinyl compound, and/or a copolymer block (S) composed principally of a conjugated diene and an aromatic vinyl compound.

[10] The impact absorber composition according to [9] above, wherein a content of vinyl derived from the pre-hydrogenation conjugated diene in the copolymer block (S), or an amount of α-olefin having 3 or more carbon atoms derived from alkylene is in a range of 5% or more to 60% or less.

[11] The impact absorber composition according to [9] or [10] above, wherein the copolymer block (S) comprises a copolymer composed principally of a conjugated diene and an aromatic vinyl compound and has two or more segments differing in content of the aromatic vinyl compound, and a difference in content of the aromatic vinyl compound between any two segments is 5% by weight or more.

[12] The impact absorber composition according to [11] above, wherein the copolymer block (S) contains two adjoining segments differing in content of aromatic vinyl compound by 5% by weight or more.

[13] The impact absorber composition according to [11] or [12] above, wherein the segments differing in the content of the aromatic vinyl compound comprise a segment (S1) of a monomeric composition having an aromatic vinyl compound content of 25 to 55% by weight, and a segment (S2) of a monomeric composition having an aromatic vinyl compound content of 55 to 80% by weight, and amounts of the segments S1 and S2 are each 30% by weight or more based on the copolymer block (S).

[14] The impact absorber composition according to any one of [1] to [13] above, wherein a content of the aromatic vinyl compound in the copolymer containing the aromatic vinyl compound is more than 50% by weight.

A process for producing a copolymer containing an aromatic vinyl compound by anionic polymerization, which comprises:

a step of polymerizing a copolymer block (S) composed principally of an aromatic vinyl compound and a conjugated diene, wherein the step of polymerizing the copolymer block (S) is carried out by supplying the aromatic vinyl compound and the conjugated diene to a polymerization tank for polymerization by changing a ratio of the aromatic vinyl compound to the conjugated diene ratio, or by portioning a monomeric mixture differing in a ratio of the aromatic vinyl compound to the conjugated diene in two or more stages.

[16] The process for producing a copolymer containing an aromatic vinyl compound according to [15] above, wherein the step of polymerizing the copolymer block (S) comprises a step of supplying the aromatic vinyl compound and the conjugated diene to a polymerization tank as a monomeric mixture (M1) having the aromatic vinyl compound content of 25 to 55% by weight for polymerization, and a step of supplying the aromatic vinyl compound and the conjugated diene to a polymerization tank as a monomeric mixture (M2) which differs in composition from the M1 and has an aromatic vinyl compound content of 55 to 80% by weight for polymerization.

[17] The process for producing a copolymer containing an aromatic vinyl compound according to [16] above, wherein a difference in the aromatic vinyl compound content between the monomeric mixture (M1) and the monomeric mixture (M2) is 5 by weight or more to 30% by weight or less.

[18] The impact absorber composition according to any one of [1] to [14], which comprises the copolymer containing the aromatic vinyl compound and a thermoplastic resin other than the copolymer containing the aromatic vinyl compound, wherein a ratio by weight of the copolymer containing the aromatic vinyl compound to the thermoplastic resin is 95/5 to 5/95.

[19] The impact absorber composition according to [18] above, wherein the thermoplastic resin is a copolymer containing ethylene.

[20] The impact absorber composition according to [19] above, comprising the copolymer containing the aromatic vinyl compound, a thermoplastic resin containing 50% by weight or more of ethylene or an olefinic thermoplastic elastomer, and an inorganic filler.

[21] The impact absorber composition according to any one of [1] to [14] or [18] to [20], further comprising a foaming agent.

[22] The impact absorber composition according to any one of [1] to [14] or [18] to [21], further comprising a crosslinking agent.

[23] The impact absorber composition according to any one of [1] to [14] or [18] to [22], which has a specific gravity of 0.28 or more to 0.35 or less, a hardness at 22° C. of 47° or more to 53° or less, an impact resilience of 14% or less, and a peel strength of 27 N/cm or more.

[24] A footwear using the impact absorber composition according to any one of [1] to [14] or [18] to [23].

[25] A laminate obtained by laminating the impact absorber composition according to any one of [1] to [14] or [18] to [23] and a plywood.

Advantages of the Invention

According to the present invention, it is possible to provide an impact absorber composition which excels in all of the desirable properties such as light weight, low-temperature hardening resistance and low impact resilience (impact absorption properties). The impact absorber composition of the present invention can be utilized most advantageously as a footwear material, particularly a sole material for footwear.

BEST MODE FOR CARRYING OUT THE INVENTION

The embodiment described below is intended to illustrate the present invention, and it should be understood that the present invention is not limited to this embodiment alone but can be embodied in various other ways without departing from the gist of the invention.

The impact absorber composition of the present embodiment is an impact absorber composition which comprises a copolymer containing an aromatic vinyl compound where a value of tan δ at a specific temperature and a tan δ peak temperature of the copolymer are controlled to stay in the specific ranges.

It is required for the copolymer used in the present embodiment that the tan δ peak obtained from a measurement of dynamic viscoelasticity (at 1 Hz) is more than 0° C. from the viewpoint of impact absorption properties and is 20° C. or less from the viewpoints of impact absorption properties and low-temperature hardening resistance. More specifically, the temperature range of the tan δ peak is preferably from 1° C. to 17° C., more preferably from 2° C. to 15° C., even more preferably from 3° C. to 13° C. If the tan δ peak is 0° C. or less, the impact absorption properties tends to lower, and if is more than 20° C., low-temperature hardening becomes liable to take place and also impact absorption properties tends to deteriorate.

In order to realize high low-temperature hardening resistance as well as high impact absorption properties in a wide range of foaming specific gravity (0.05 to 1.1 g/cm$^3$) or a wide range of working temperature, the copolymer is preferably such that its tan δ value obtained from the measurement of dynamic viscoelasticity (at 1 Hz) is 0.4 or more, preferably 0.5 or more, in the whole temperature range from 5° C. to 15° C., and is more preferably 0.5 or more in the whole temperature range from 5° C. to 17° C. If there is a case where the tan δ value becomes less than 0.4 in the temperature range from 5° C. to 15° C., it tends to become difficult to maintain a high impact absorption properties in a wide range of foaming specific gravity or a wide range of working temperature.

It is further required for the copolymer of the present invention that, from the viewpoint of impact absorption properties, the tan δ value at 15° C. obtained from the measurement of dynamic viscoelasticity (at 1 Hz) is 0.5 or more, preferably 0.55 or more, more preferably 0.6 or more. If the tan δ value at 15° C. is less than 0.5, the impact absorption properties tend to lower.

As for the method for controlling the tan δ peak and tan δ value, such control can be effected by various means such as, for instance, containing a random copolymer block of hydrogenated conjugated diene and/or alkylene and an aromatic vinyl compound in the impact absorber composition of the present embodiment, or adjusting the content or distribution of vinyl derived from the pre-hydrogenation conjugated diene, amount of hydrogenation of the conjugated diene, amount or distribution of α-olefin having 3 or more carbon atoms derived from alkylene, distribution of molecular weight, and content of the block composed mainly by an aromatic vinyl compound.

The copolymer used in the present embodiment is one whose modulus of rigidity G' at −5° C. obtained from the measurement of dynamic viscoelasticity (at 1 Hz) is preferably 500 MPa or less, and modulus of rigidity G' at 40° C. is preferably 4 MPa or less, from the viewpoint of impact absorption properties.

The data of dynamic viscoelasticity shown here are the values obtained by cutting the specimen to a size of 10 mm in width and 35 mm in length, setting this specimen in a twisted type geometry of ARES (trade name, mfd. by TA Instruments Inc.), and measuring the dynamic viscoelasticity of the specimen under the following conditions: effective measured length=25 mm; strain=0.5%; frequency=1 Hz; temperature=−50° C. to 50° C.; heating rate=3° C./min. The peak temperature can be determined from automatic measurement by RSIOrchestrator (trade name, mfd. by TA Instruments Inc.).

The copolymer containing an aromatic vinyl compound, which is contained in the impact absorber composition of the present embodiment, is not specifically limited but is preferably a copolymer containing an aromatic vinyl compound and a conjugated diene and/or a copolymer containing an aromatic vinyl compound and alkylene, in view of productivity and ease of adjustment of the tan δ value.

Examples of the above-mentioned aromatic vinyl compounds may include styrene, α-methylstyrene, p-methylstyrene, divinylbenzene, 1,1-diphenylethylene, N,N-dimethyl-p-aminoethylstyrene, and N,N-diethyl-p-aminoethylstyrene. These compounds may be used alone or as a combination of any two or more. The less the amount of the aromatic vinyl compound in the copolymer, the more preferable for reduction of weight of the composition. The specific gravity of the copolymer is preferably 1.1 or less, more preferably 1.00 or less, even more preferably 0.95 or less.

The conjugated diene mentioned above is a diolefin having a pair of conjugated double bonds, and examples thereof may include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. The most commonly used among these dienes are 1,3-butadiene and isoprene. These dienes may be used alone or any two or more of them. Between 1,3-butadiene and isoprene, 1,3-butadiene is preferred from the viewpoint of mechanical strength. The content of 1,3-butadiene in the conjugated diene is preferably 80% by weight or more, more preferably 90% by weight or more, even more preferably 95% by weight or more.

The "alkylene" mentioned above refers to a monoolefinic unit such as ethylene unit, propylene unit, butylene unit, hexylene unit or octylene unit. Among these monoolefinic units, ethylene unit, propylene unit and butylene unit are preferred for the economical reason. These units may be used alone or as a combination of any two or more of them.

The copolymers containing an aromatic vinyl compound and a conjugated diene, that can be used in the impact absorber composition in the present embodiment, are preferably hydrogenated in view of light resistance, heat resistance and foaming properties of the obtained composition. The ratio of hydrogenation is not specifically limited in the present embodiment, but from the viewpoint of mechanical strength, the ratio of hydrogenation to the double bonds based on the conjugated diene compound in the pre-hydrogenation copolymer is preferably 97% or less, and from the viewpoints of heat resistance, light resistance and shrinkage resistance at the time of crosslinkage, the ratio of hydrogenation is preferably 5% or more. The range of the ratio of hydrogenation is more preferably from 5% or more to 70%, even more preferably 10% to 60%, and especially more preferably from 15% to 50%.

The content of the vinyl bonds based on the conjugated diene in the copolymer and the hydrogenation ratio of hydrogenation of the copolymer can be known by using a nuclear magnetic resonance (NMR) system.

Regarding the copolymer used in the impact absorber composition of the present embodiment, the micro-structure (cis, trans and vinyl ratios) of the pre-hydrogenation conjugated diene moiety can be optionally changed by using a polar compound to be discussed later. Although no definite limitations are imposed on this matter, the content of vinyl bonds in the diene is preferably 5% or more from the viewpoint of productivity, while it is preferably 60% or less from the viewpoint of mechanical strength of the composition. The content of vinyl bond in the diene is more preferably in the range from 10% or more to less than 50%, even more preferably in the range from 10% or more to less than 30%, and especially more preferably in the range from 10% or more to less than 20%.

In order to control the tan δ value at a specific temperature of the copolymer and the tan δ peak temperature in a specific range, it is preferable to incorporate in the copolymer a random copolymer block of a hydrogenated conjugated diene and/or alkylene and an aromatic vinyl compound, or to incorporate a polymer block composed principally of isoprene and having a high 3,4-isoprene ratio and a distribution of 3,4-isoprene concentration by changing the temperature during polymerization or by adding a polar solvent stepwise.

Particularly, from the viewpoint of providing higher mechanical strength, it is preferable to comprise at least one of copolymer blocks (which may be hydrogenated, same in the following) composed principally of conjugated diene and/or alkylene and an aromatic vinyl compound. The content of the aromatic vinyl compound in the copolymer block is preferably 40% by weight or more, more preferably 50% by weight or more.

The content of aromatic vinyl compound polymer block in the copolymer used in the impact absorber composition in the present embodiment is preferably 40% by weight or less from the viewpoints of tear strength, wear resistance, low impact resilience (impact absorption properties) and flexibility, while it is preferably 1% by weight or more from the viewpoints of productivity and tear strength. The content is more preferably from 5 to 35% by weight, even more preferably from 10 to 30% by weight, and especially more preferably from 10 to 25% by weight.

Here, the content of the aromatic vinyl compound polymer block in the copolymer is defined by the following formula by using the weight of the aromatic vinyl compound polymer block (excluding the aromatic vinyl compound polymers with an average polymerization degree of approximately 30 or less) obtained from the method in which the pre-hydrogenation copolymer is oxidatively destructed with a tertiary butyl hydroperoxide with osmium tetraoxide as a catalyst (method described in I. M. Kolthoff et al. J. Polym. Sci. 1, 429 (1946), hereinafter referred to as "osmium tetraoxide method":

Content (wt %) of aromatic vinyl compound polymer block=(weight of aromatic vinyl compound polymer block in pre-hydrogenation copolymer/ weight of pre-hydrogenation copolymer)×100

The copolymer used in the impact absorber composition of the present embodiment is not subject to any specific structural limitations. Although the copolymer may be of any type of structure available, it preferably has at least one of the structures selected from those shown below by the general formulae:

$$H—S \quad (1)$$

$$S—H—S \quad (2)$$

$$(H—S)m\text{-}X \quad (3)$$

$$(H—S)n\text{-}X—(H)p \quad (4)$$

$$(H—S)n\text{-}H \quad (5)$$

$$H—(S\text{-}E)n \quad (6)$$

$$H\text{-}(E\text{-}S)n \quad (7)$$

$$E\text{-}(S—H)n\text{-}S \quad (8)$$

$$H\text{-}(E\text{-}S)n\text{-}H \quad (9)$$

$$(E\text{-}S—H)m\text{-}X \quad (10)$$

$$(H\text{-}E\text{-}S)m\text{-}X \quad (11)$$

$$(H—S\text{-}E)m\text{-}X \quad (12)$$

$$(H\text{-}E\text{-}S\text{-}E)m\text{-}X \quad (13)$$

(wherein, S represents a copolymer block composed principally of a conjugated diene and/or alkylene and an aromatic vinyl compound, H represents a polymer block composed principally of an aromatic vinyl compound, and E represents a polymer block composed principally of a conjugated diene and/or alkylene; m represents an integer of 2 or more, preferably 2 to 10; n and p represent each an integer of 1 or more, preferably 1 to 10; and X represents a coupling agent residue or a polyfunctional initiator residue. The expression "composed principally" which used in the present embodiment means that 60% by weight or more, preferably 80% by weight or more, even more preferably 90% by weight or more, especially more preferably 95% by weight or more of the copolymer block is composed of the specified material(s)).

The copolymer used in the impact absorber composition of the present embodiment has a structure of (H—S)n-H or (H—S)m-X from the viewpoint of productivity.

The distribution of the aromatic vinyl compound in the copolymer block S composed principally of a conjugated diene and/or alkylene and an aromatic vinyl compound (which may hereinafter be referred to simply as "copolymer block (S)") in the above general formulae is not specifically limited as far as it falls within the range of the above-defined content of the aromatic vinyl compound; the compound may be distributed uniformly or may be distributed taper-like, stepwise, or in a form of convexity or concavity. Also, in the copolymer block (S), there may coexist plural segments differing in content of aromatic vinyl compound from each other.

In order to control the tan δ value of the copolymer at a specific temperature and the peak temperature of tan δ in a specific range, the copolymer block (S) preferably comprises a copolymer composed principally of an aromatic vinyl compound and a conjugated diene and has two or more segments differing in content of the aromatic vinyl compound, and a difference in content of the aromatic vinyl compound between any two segments is preferably 5% by weight or more.

The term "segment" used herein refers to a unit of a polymer chain in which the content of aromatic vinyl compound in the copolymer block (S) is substantially constant, preferably a unit of a polymer chain in which the variation of the content of aromatic vinyl compound is less than 5% by weight. Such a segment can be formed by supplying an aromatic vinyl compound and a conjugated diene at a specified ratio for polymerization. In case the supply ratio of an aromatic vinyl compound and a conjugated diene is varied continuously, the segment may be regarded as another one at a point when the content of aromatic vinyl compound in the polymer chain has changed 5% by weight or more. The content of aromatic vinyl compound in the segment shown here is the mean value in the particular segment.

The content of aromatic vinyl compound in the copolymer block (S) can be determined by analyzing the individual copolymers differing in ratio of addition in the polymerization, which have been extracted multiple times from the polymerization tank during polymerization of the copolymer block (S), by means of nuclear magnetic resonance (NMR) spectrum described in the Examples given below. The content of aromatic vinyl compound in the copolymer block (S) shown here is the mean value at a specified ratio of addition in the polymerization.

The copolymer block (S) comprises a copolymer composed principally of an aromatic vinyl compound and a conjugated diene, and it is preferable for this copolymer block (S) to contain two adjoining segments differing in content of aromatic vinyl compound by 5% by weight or more, because in this case, the tan δ value tends to be in a wider range at a specific temperature.

The above-mentioned segments differing in content of aromatic vinyl compound comprise a segment (S1) of a monomeric composition with an aromatic vinyl compound content of 25 to 55% by weight, and a segment (S2) of a monomeric composition with an aromatic vinyl compound content of 55 to 80% by weight, and S1 and S2 preferably have a ratio of 30% by weight or more to the copolymer block (S), because in this case, there is a tendency to enhance low-temperature hardening resistance and impact absorption properties.

Regarding the copolymer used in the impact absorber composition in the present embodiment, no specific limitations are imposed on the distribution of hydrogenation of the double bonds based on the conjugated diene compound. The double bonds based on the conjugated diene compound may exist in large numbers at one or more molecular end block portions of the copolymer depending on the necessity for providing specific properties such as high mechanical strength to the composition.

The melt flow rate (measured according to JIS K-7210 at 190° C. under a load of 2.16 kg) of the copolymer used for the impact absorber composition of the present embodiment is preferably in the range from 0.01 or more to 60 or less (unit of measurement: g/10 min) in view of formability of the composition, flexibility of the crosslinked foams, tear strength, tensile strength and compression set resistance. This melt flow rate is more preferably 0.1 or more to 40 or less, even more preferably 0.5 or more to 35 or less, especially more preferably 1.0 or more to 30 or less.

The weight-average molecular weight of the copolymer used in the impact absorber composition of the present embodiment is preferably 50,000 or more from the viewpoints of mechanical strength such as tensile strength, tear strength and compression set resistance, and is preferably 500,000 or less from the viewpoint of formability of the composition. The range of weight-average molecular weight of the copolymer is more preferably from 70,000 to 450,000, even more preferably from 90,000 to 400,000.

The distribution of molecular weight of the copolymer used for the impact absorber composition in the present embodiment preferably falls within the range of from 1.01 to 6.00. From the viewpoint of formability of the composition, the range of distribution is preferably from 1.03 to 5.00, more preferably from 1.03 to 2.00.

The weight-average molecular weight and the molecular weight distribution of the copolymer in the present embodiment can be determined from the polystyrene-reduced molecular weight measured by gel permeation chromatography (LC-10, trade name, mfd. by Shimadzu Corp.; columns: TSKgelGMHXL (4.6 mmID×30 cm), two; solvent: tetrahydrofuran).

The content of the copolymer in the impact absorber composition of the present embodiment is preferably 5% by weight or more, more preferably 20% by weight or more, even more preferably 40% by weight or more, especially more preferably 60% by weight or more.

The process (polymerization process) for producing the copolymer in the impact absorber composition of the present embodiment is not specifically limited; it is possible to use, for instance, coordination polymerization, anionic polymerization, cationic polymerization and such. Among those, anionic polymerization is preferred because of easier structural control of the copolymer.

The known processes can be used for producing the copolymer by anionic polymerization. Examples of the processes may include the processes disclosed in JP-B-36-19286, JP-B-43-17979, JP-B-46-32415, JP-B-49-36957, JP-B-48-2423, JP-B-48-4106, JP-B-56-28925, JP-B-51-49567, JP-A-59-166518, and JP-A-60-186577.

In order to controlling the tan δ value at a specific temperature and the peak temperature of tan δ in a specific range, it is preferable to use a process for producing a copolymer containing an aromatic vinyl compound of the present embodiment by anionic polymerization, which comprises a step of polymerizing a copolymer block (S) composed principally of an aromatic vinyl compound and a conjugated diene, wherein the step of polymerizing the copolymer block(s) is carried out by supplying the aromatic vinyl compound and the conjugated diene to a polymerization tank by changing a ratio of the aromatic vinyl compound to the conjugated diene, or by portioning a monomeric mixtures differing in a ratio of aromatic vinyl compound to conjugated diene in two or more stages.

It is more preferable to use a process, wherein the step for polymerizing the copolymer block (S) comprises a step of supplying the aromatic vinyl compound and the conjugated diene to a polymerization tank as a monomeric mixture (M1) having the aromatic vinyl compound content of 25 to 55% by weight, and a step of supplying the aromatic vinyl compound and the conjugated diene to a polymerization tank as a monomeric mixture (M2) which differs in composition from the M1 and has an aromatic vinyl compound content of 55 to 80% by weight.

It is still more preferable to use a process, wherein the difference in the aromatic vinyl compound content between the monomeric mixture (M1) and the monomeric mixture (M2) is 5% by weight or more to 30% by weight or less.

The total weight percent of the monomeric mixture (M1) and the monomeric mixture (M2) in the whole of monomers supplied to the polymerization tank for polymerization of the copolymer block (S) is preferably 30% by weight or more. The M1/M2 ratio by weight falls in the range from 0.5 to 0.9, and the total weight percent of M1 and M2 is more preferably 80% by mass or more.

The copolymers used for the impact absorber composition in the present embodiment include the modified copolymers in which at least one atomic group having a functional group is bonded. Examples of the atomic groups having a functional group include those containing at least one functional group selected from hydroxyl groups, carboxyl groups, carbonyl groups, thiocarbonyl groups, acid halide groups, acid anhydride groups, carboxylic acid groups, thiocarboxylic acid groups, aldehyde groups, thioaldehyde groups, carboxylate groups, amide groups, sulfonic acid groups, sulfonate groups, phosphoric acid groups, phosphate groups, amino groups, imino groups, nitrile groups, pyridyl groups, quinoline groups, epoxy groups, thioepoxy groups, sulfide groups, isocyanate groups, isothiocyanate groups, silicon halide groups, alkoxysilicon groups, tin halide groups, alkoxytin groups, phenyltin groups, boronic acid groups, boronic acid bases, boron-containing groups, and the like.

The position of the functional groups in the copolymer is not specifically limited; they may be positioned in the molecular chain or at the molecular end, or may be grafted. The concentration distribution of the functional groups in the copolymer is also not specifically limited. The detail of the method for graft modification, refer to, for instance, JP-A-62-79211.

The process for producing a modified copolymer has no specific limitations, and it is possible, for instance, to use a process in which polymerization is carried out using a polymerization initiator having a functional group or an unsaturated monomer having a functional group, followed by hydrogenation (primary modification). There may also be used a process in which hydrogenation is conducted after addition-reacting a modifier to the living terminal of a polymer obtained by using an organic alkaline metal compound as a polymerization catalyst, as disclosed in JP-B-4-39495 (U.S. Pat. No. 5,115,035). There may also be used a process in which initially an organic alkaline metal compound is reacted with a block copolymer (metalation reaction), and then a modifier is further reacted, followed by hydrogenation. A modifier may be reacted after the metalation reaction which follows hydrogenation of the copolymer.

The hydroxyl group or amino group may be converted to an organic metal salt, depending on the type of the modifier used, at the stage where the modifier has been reacted. In that case, this metal salt may be returned to the hydroxyl group or amino group by treating it with water or a compound having active hydrogen such as alcohols. A protective group may be attached to the modifier, in which case the protective group may be removed during or after completion of hydrogenation.

In another process for producing a modified copolymer, a non-modified copolymer or a primary-modified copolymer may be reacted with a compound having a functional group (secondary modification).

In a case where the copolymer used for the impact absorber composition of the present embodiment is a modified or secondary-modified copolymer, since the functional group attached to the modified copolymer has reactivity with the polyolefinic thermoplastic resins having the secondary modifier and/or a functional group, inorganic fillers and additives having a polar group, and the modified hydrogenated copolymer contains nitrogen or oxygen atoms or a carbonyl group, there is effectively produced a synergistic action due to physical affinity such as hydrogenation between the above-said group and the polar group of the polyolefinic thermoplastic resin, inorganic filler and additives having a polar group, and this contributes to making manifest the effect of the present invention.

No specific limitation is given on the hydrogenation catalyst used for producing a hydrogenated copolymer obtained by hydrogenating a copolymer containing an aromatic vinyl compound and a conjugated diene, which can be used for the impact absorber composition of the present embodiment. It is possible to use the conventional hydrogenation catalysts such as (1) carried type heterogeneous hydrogenation catalysts formed by carrying a metal such as Ni, Pt, Pd or Ru on carbon, silica, alumina, diatom earth or the like; (2) so-called Ziegler hydrogenation catalysts using an organic acid salt of Ni, Co, Fe, Cr or the like or a transition metal salt such as acetylacetone salt and a reducing agent such as organoaluminum; and (3) homogeneous hydrogenation catalysts such as so-called organometallic complexes such as organometallic compounds of Ti, Ru, Rh, Zr or the like. More specifically, the hydrocarbon catalysts such as disclosed in JP-B-42-8704, JP-B-43-6636, JP-B-63-4841, JP-B-1-37970, JP-B-1-53851 and JP-B-2-9041 can be used. A preferred example of such hydrogenation catalysts is a mixture of a titanocene compound and/or a reducing organometallic compound.

In the present embodiment, the hydrogenation reaction is carried out at a temperature in the range of generally 0 to 200° C., preferably 30 to 150° C. The hydrogen pressure used for the hydrogenation reaction is generally 0.1 to 15 MPa, preferably 0.2 to 10 MPa, more preferably 0.3 to 5 MPa. The hydrogenation reaction time is generally 3 minutes to 10 hours, preferably 10 minutes to 5 hours. The hydrogenation reaction can be conducted by a batch process, a continuous process or a combination of both processes.

The copolymer solution obtained in the manner described above is treated as required to remove the catalyst residue, and then the hydrogenated polymer is separated from the solution. For separating the solvent, the following methods can be used for instance: A polar solvent which serves as a poor solvent for the produced copolymer, such as acetone or an alcohol, is added to the reaction solution after hydrogenation to cause precipitation of the polymer and the precipitate is recovered; The reaction solution is poured into hot water with stirring, and after removing the solvent by steam stripping, the product is recovered; The copolymer solution is heated directly to evaporate away the solvent. Various types of stabilizer such as phenolic stabilizer, phosphorus-based stabilizer, sulfur-based stabilizer and amine-based stabilizer can be added to the copolymer used for the impact absorber of the present invention.

In the present embodiment, a copolymer-containing impact absorber composition suited for producing the crosslinked foams can be obtained by combining a copolymer (including a modified copolymer or a secondary-modified copolymer) with a thermoplastic resin other than the above-mentioned copolymers or an olefinic thermoplastic elastomer. The ratio by weight of the copolymer to the thermoplastic resin other than the above copolymer and/or the thermoplastic elastomer is preferably 95/5 to 5/95, more preferably 95/5 to 40/60, even more preferably 95/5 to 60/40. When the ratio of the copolymer to the thermoplastic resin other than the above copolymer falls in the above-defined range, it is possible to obtain a crosslinked product or a crosslinked foam having high tear strength, compression set resistance and low impact resiliency.

In the present embodiment, when the copolymer is a modified copolymer, it is possible to obtain a copolymer-containing impact absorber composition comprising a modified copolymer and a secondary modifier with a content of 0.01 to 20 parts by weight, preferably 0.02 to 10 parts by weight, more preferably 0.05 to 7 parts by weight, to 100 parts by weight of the thermoplastic resin composition other than the above copolymer.

Examples of the thermoplastic resin and olefinic thermoplastic elastomer may include polyethylene; copolymers of ethylene and other monomers copolymerizable with ethylene having an ethylene content of 50% by weight or more, such as ethylene-propylene copolymer, ethylene-propylene-butylene copolymer, ethylene-butylene copolymer, ethylene-hexene copolymer, and ethylene-octene copolymer. Some of these copolymers are commercially available under the trade names of TAFMER (Mitsui Chemicals Inc.), Engage (Dow Chemical Company), INFUSE (Dow Chemical Company) and MILASTOMER (Mitsui Chemicals Inc.). It is also possible to use ethylene-vinyl acetate copolymer and its hydrolyzates; copolymers of ethylene and acrylic esters which are esters of alcohols having a carbon number of 1 to 24 or glycidyl alcohol and acrylic acids such as methyl acrylate, ethyl acrylate, propyl acrylate, butyl acrylate, pentyl acrylate, hexyl acrylate, etc.; copolymers of ethylene and methacrylic esters which are esters of alcohols having a carbon number of 1 to 24 or glycidyl alcohol and methacrylic acids such as methyl methacrylate, ethyl methacrylate, propyl methacrylate, butyl methacrylate, pentyl methacrylate, hexyl methacrylate, etc.; polyethylene polymers such as ethylene-acrylic acid ionomer and chlorinated polyethylene; polypropylene; copolymers of propylene and other monomers copolymerizable with propylene having an propylene content of 50% by weight or more, such as propylene-ethylene copolymer, propylene-ethylene-butylene copolymer, propylene-butylene copolymer, propylene-hexene copolymer, and propylene-octene copolymer; copolymers of propylene and the above-mentioned acrylic esters; copolymers of propylene and the above-mentioned methacrylic esters; polypropylene polymers such as chlorinated polypropylene; cyclic olefinic copolymers such as ethylene-norbornene polymer; polybutene polymers, and the like.

Examples of the thermoplastic resins other than the polyolefinic thermoplastic resins mentioned above may include block copolymer resins of conjugated diene compounds and aromatic vinyl compounds, polymers of the above-mentioned aromatic vinyl compounds, copolymer resins of the above-mentioned aromatic vinyl compounds and other vinyl monomers, for instance, ethylene, propylene, butylenes, vinyl chloride, vinylidene chloride, vinyl acetate, acrylic acid and acrylic esters such as methyl acrylate, methacrylic acid and methacrylic esters such as methyl methacrylate, acrylonitrile, methacrylonitrile and the like, rubber-modified styrene resins (HIPS), acrylonitrile-butadiene-styrene copolymer resins (ABS), methacrylic ester-butadiene-styrene copolymer resins (MBS), and the like.

Examples of the above-mentioned thermoplastic resins also include polyvinyl chloride, polyvinylidene chloride, polyvinyl chloride resins, polyvinyl acetate resins and their hydrolyzates, polymers of acrylic acids and their esters or amides, polymers of methacrylic acids and their esters or amides, polyacrylate resins, acrylonitrile and/or methacrylonitrile polymers, and nitrile resins which are the copolymers with other copolymerizable monomers containing the above-cited acrylonitrile monomers in an amount of 50% by weight or more.

Examples of the above-mentioned thermoplastic resins further include polyamide resins such as nylon-46, nylon-6, nylon-66, nylon-610, nylon-11, nylon-12 and nylon-6/nylon 12 copolymer, polyester resins, thermoplastic polyurethane resins, polycarbonate type polymers such as poly-4,4'-dioxydiphenyl-2,2'-propane carbonate, thermoplastic polysulfones such as polyethersulfone and polyallylsulfone, polyoxymethylene resins, polyphenylene ether resins such as poly(2,6-dimethyl-1,4-phenylene)ether, polyphenylene sulfide resins such as polyphenylene sulfide and poly-4,4'-diphenylene sulfide, polyarylate resins, polyether ketone polymers or copolymers, polyketone resins, fluorine resins, polyoxybenzoyl polymers, polymide resins, and polybutadiene resins such as 1,2-polybutadiene and transpolybutadiene.

Among these thermoplastic resins and olefinic thermoplastic elastomers, polyethylene resins, especially ethylene-vinyl acetate copolymer and ethylene-α-olefin copolymer are preferred because of excellent crosslinkability. These copolymers may be either random or block. From the viewpoint of foamability, the polymers having a branched structure in the molecules, such as ethylene-propylene copolymer, ethylene-butylene copolymer and ethylene-octene copolymer are preferred. These thermoplastic resins may be used alone or as a combination of any two or more of them. The melt flow rate of these thermoplastic resins (measured according to JIS K-7210 at 190° C. under a load of 2.16 kg) preferably stays within the range of 0.1 to 100 g/10 min.

Any conventional known processes, such as transition polymerization, radical polymerization and ionic polymerization, can be employed for the polymerization of the above thermoplastic resins or olefinic thermoplastic elastomers. The number-average molecular weight of these thermoplastic resins is generally 1,000 or more, preferably 5,000 to 5,000,000, more preferably 10,000 to 1,000,000. Also, these thermoplastic resins may have been modified in advance.

The impact absorber composition in the present embodiment may be blended with a rubber-like polymer exclusive of the copolymer used in the present embodiment. Examples of the rubber-like polymers usable here may include butadiene rubber and its hydrogenation product, styrene-butadiene rubber and its hydrogenation product, isoprene rubber, acrylonitrile-butadiene rubber and its hydrogenation product, olefinic elastomers such as chloroprene rubber, ethylene-propylene rubber, ethylene-propylene-diene rubber, ethylene-butene-diene rubber, ethylene-butene rubber, ethylene-hexene rubber, and ethylene-octene rubber, butyl rubber, brominated butyl rubber, acrylic rubber, fluorine rubber, silicone rubber, chlorinated polyethylene rubber, epichlorohydrin rubber, and α,β-unsaturated nitrile-acrylic ester-conjugated diene copolymer rubber.

Examples of the rubber-like polymers mentioned above also include urethane rubber, polysulfide rubber, styrene elastomers such as styrene-butadiene block copolymer and its hydrogenation product, and styrene-isoprene block copolymer and its hydrogenation product, as well as natural rubber. These rubber-like polymers may be modified rubbers provided with functional groups. Also, they may have been modified in advance. Among these polymers, butyl rubber and brominated butyl rubber are preferred in view of impact absorption properties.

Beside the copolymer in the present embodiment, it is possible to blend a softening agent as required for improving processability. Mineral oils or liquid or low-molecular weight synthetic softening agents are preferred for use in the present embodiment. Especially, the mineral oil base softening agents for rubber, which are called process oil or extender oil generally used for softening, volume increase and improvement of processability of the rubber, are the mixtures of aromatic rings, naphthenic rings and paraffinic chains, and of these softening agents, those in which the carbon number of the paraffinic chains accounts for 50% or more of the whole carbon number are called paraffin type, those in which the carbon number of the naphthenic rings holds 30 to 45% of the whole carbon number are called naphthene type, and those in which the carbon number of the aromatic group exceeds 30% are called aromatic group type. The softening agents used in the present invention are preferably of the naphthene type and/or paraffin type.

As the synthetic softening agents, polybutene, low-molecular weight polybutadiene, liquid paraffin and the like can be used, but the above-mentioned mineral oil base softening agents for rubber are preferably used in the present embodiment. Such a softening agent is blended in an amount within the range of 0 to 200 parts by weight, preferably 0 to 100 parts by weight, to 100 parts by weight of the copolymer.

Beside the copolymer in the present embodiment, it is also possible to use additionally a copolymer having a peak of tan δ at 0° C. or less in an amount of 80 parts by weight or less to 100 parts by weight of the copolymer for improving processability or low-temperature hardening properties. From the viewpoint of mechanical strength or impact absorbability, the amount of such an additive copolymer is preferably 50% by weight or less, more preferably 30% by weight or less.

The impact absorber composition in the present embodiment may be blended with a variety of additives optionally in addition to the copolymer.

The type of additives to be used is not specifically limited as far as they are of the type commonly used for blending in the thermoplastic resins or rubber-like polymers. Examples of such additives may include inorganic fillers such as silica, talc, mica, calcium silicate, hydrotalcite, kaolin, diatom earth, graphite, calcium carbonate, magnesium carbonate, magnesium hydroxide, aluminum hydroxide, calcium sulfate and barium sulfate, and organic fillers such as carbon black.

Examples of the additives further include lubricants such as stearic acid, behenic acid, zinc stearate, calcium stearate, magnesium stearate and ethylenebisstearoamide, release agents, organopolysiloxane, plasticizers such as mineral oils, antioxidants such as hindered phenolic antioxidants and phosphorus-based, sulfur-based and amine-based heat stabilizers, hindered amine-based light stabilizers, benzotriazole-based ultraviolet absorbers, flame retardants, antistatics, reinforcements such as organic fiber, glass fiber, carbon fiber and metallic whisker, colorants such as titanium oxide, iron oxide and carbon black, and other materials such as shown in "Rubber and Plastic Compounded Drugs" (compiled by Rubber Digest Ltd.).

The impact absorber composition of the present embodiment is preferably a foamed impact absorber composition in view of its impact absorption properties, and preferably used as a foamed impact absorber.

The process for producing the impact absorber composition in the present embodiment is not specifically limited, and various known processes can be used. For mixing of the composition, it is possible to use, for instance, a melt mixing method using an ordinary mixer such as roll mill, Banbury mixer, single screw extruder, twin screw extruder, coknearder and multiple screw extruder, and a method in which after the components have been dissolved or dispersed and mixed, the solvent is removed by heating. In the present invention, the melt mixing method using an extruder is preferred in view of productivity and good mixing performance.

The process for obtaining a crosslinked foam in the present embodiment is not specifically limited, and the known methods can be used. An extrusion foaming method, press foaming method or injection foaming method is preferred in view of attaining a high mechanical strength. The foamed product may be compressed down to a prescribed specific gravity by hot press or other suitable means.

In the present embodiment, the chemical and physical methods are available for foaming, according to either of which it is possible to form and distribute the foams in the inside of the product material by adding a foaming agent either chemical or physical and either organic or inorganic. A crosslinked foamed material produced in this way is characteristically light in weight and flexible and also exhibits excellent tear resistance, compression set resistance, low impact resilience (impact absorption properties) and wear resistance, so that this foamed material finds particularly useful application as a footwear sole material.

Examples of the inorganic foaming agents may include sodium bicarbonate, ammonium carbonate, ammonium bicarbonate, ammonium nitrite, azide compounds, sodium borohydride, and metal powders. Examples of the organic foaming agents may include azodicarbonamide, azobisformamide, azobisisobutyronitrile, barium azodicarboxylate, N,N'-dinitrosopentamethylenetetramine, N,N'-dinitroso-N,N'-dimethylterephthalamide, benzenesulfonylhydrazide, p-toluenesulfonylhydrazide, p,p'-oxybisbenzenesulfonylhydrazide, and p-toluenesulfonylsemicarbazide.

Examples of the physical foaming agents may include hydrocarbons such as pentane, butane and hexane, halogenated hydrocarbons such as methyl chloride and methylene chloride, gases such as nitrogen and air, and fluorinated hydrocarbons such as trichlorofluoromethane, dichlorodifluoromethane, trichlorotrifluoroethane, chlorodifluoroethane and hydrofluorocarbon. These foaming agents may be used as a combination of two or more of them. The amount of the foaming agent blended is generally 0.1 to 8 parts by weight, preferably 0.3 to 6 parts by weight, more preferably 0.5 to 5 parts by weight, per 100 parts by weight of the copolymer and the thermoplastic resin combined.

As the crosslinking agent, there can be used radical forming agents such as organic peroxides and azo compounds, oxime compounds, nitroso compounds, polyamine compounds, sulfur and sulfur compounds. The sulfur-containing compounds include sulfur monochloride, sulfur dichloride, disulfide compounds and high-molecular polysulfide compounds. A crosslinking agent is used in an amount of generally 0.01 to 20 parts by weight, preferably 0.1 to 15 parts by weight per 100 parts by weight of the copolymer and the thermoplastic resin combined.

Examples of the organic peroxides may include dicumyl peroxide, di-tert-butyl peroxide, 2,5-dimethyl-2,5-di-(tert-butylperoxy)hexane, 2,5-dimethyl-2,5-di-(tert-butylperoxy)hexine-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide, and tert-butylcumyl peroxide.

Among these organic peroxides, dicumyl peroxide, 2,5-dimethyl-2,5-di-(tert-butylperoxy)hexane, 2,5-dimethyl-2,5-di-(tert-butylperoxy)hexine-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, and di-tert-butyl peroxide are preferred in view of odorousity and scorching stability.

When crosslinking the composition by using an organic peroxide such as exemplified above, a crosslinking assistant may be used in combination with an organic peroxide. Examples of the crosslinking assistants may include peroxy crosslinking assistants such as sulfur, p-quinonedioxime, p,p'-dibenzoylquinonedioxime, N-methyl-N-4-dinitrosoaniline, nitrosobenzene, diphenylguanidine and trimethylolpropane-N,N'-m-phenylenedimaleimide; polyfunctional methacrylate monomers such as divinylbenzene, triallyl isocyanurate, triallyl cyanurate, ethylene glycol dimethacrylate, diethylene glycol dimethacrylate, polyethylene glycol dimethacrylate, trimethylolpropane trimethacrylate and allyl methacrylate; and polyfunctional vinyl monomers such as vinyl butylate and vinyl stearate. Such a crosslinking assistant is used in a ratio of generally 0.01 to 20 parts by weight, preferably 0.1 to 15 parts by weight, to 100 parts by weight of the copolymer and the thermoplastic resin combined.

When crosslinking (sulfur curing) is conducted using sulfur or a sulfur-containing compound as exemplified above, a curing accelerator such as sulfenamide type, guanidine type, thiuram type, aldehyde-amine type, aldehyde-ammonia type, thiazole type, thiourea type and dithiocarbamate type can be used as a crosslinking assistant (curing accelerator) in a necessary amount. Further, zinc flower, stearic acid or the like can be also used in a necessary amount as a crosslinking assistant (curing assistant).

The impact absorber composition in the present embodiment can be crosslinked by a commonly used method to obtain a crosslinked composition or a crosslinked foam. For instance, the composition is crosslinked at a temperature of 80 to 200° C., preferably 100 to 180° C. In the present embodiment, it is possible to use a copolymer composition which has been crosslinked by such method as metal ionic crosslinking, silane crosslinking or resin crosslinking, or a copolymer composition which has been crosslinked by a physical crosslinking means such as electron rays or radiation, or by water crosslinking, after the composition had been molded by extrusion or injection molding.

It is also possible to use a thermoplastic elastomer composition as an impact absorbing composition obtained by subjecting at least a copolymer of the present invention and a resin having no radical crosslinkability to a dynamic crosslinking operation in the presence of a radical initiator while melt mixing the materials in an extruder.

The impact absorber composition in the present embodiment is a lightweight foam having a specific gravity of 0.40 or less, and has excellent low-temperature hardening resistance, impact absorption properties and mechanical properties. The impact absorber composition of the present embodiment is preferably one which has a specific gravity of 0.35 or less, hardness at 22° C. of 47° or more to 53° or less, impact resilience of 14% or less, and peel strength of 27 N/cm or more. As for specific gravity of the composition, it is preferably in the range of 0.28 or more to 0.35 or less.

The impact absorber composition in the present embodiment comprises a copolymer containing an aromatic vinyl compound such as cited above, a thermoplastic resin containing ethylene in an amount of 50% by weight or more or an olefinic thermoplastic elastomer, and an inorganic filler, and it is more preferable that this composition has a specific gravity of 0.28 or more to 0.35 or less, hardness at 22° C. of 47° or more to 53° or less, impact resilience of 14% or less, and peel strength of 27 N/cm or more.

The impact absorber composition of the present embodiment can be used as a laminate in combination with plywood. This impact absorber composition or its laminates can be practically used as sheets or various types of molded articles. For instance, they can be used as construction materials such as flooring, walling, ceiling, sash, shutter, door, soundproof wall, roofing, vibration damper, vibration inhibitor, damper, water supply pipe, drainage pipe, etc.; vibration damping film, vibration inhibiting sheet, vibration-proof mat, and other fall-preventive sheets, mats and films; means for reducing unpleasant or resonated sound generated by acoustic devices such as disc supporting turntable, CD player, microphone holder, speaker cone edge, radio-cassette player/recorder, minidisc, etc.; OA devices such as copying machine, FAX, printer, etc.; information transfer devices such as cell-phone, mobile PC, etc.; means for reducing or muffling unpleasant or resonated sound generated by driving of motors of household electric appliances such as TV, refrigerator, outdoor unit of air conditioner, sound in ducts, etc.; and means for lessening noise in engine room or inside of automobile. Particularly, because of its high impact absorption properties, this composition is suited for use as a impact absorbing foamed products such as shoe sole, fall-preventive sheet, mat and film, and the like. The composition is also suited for use as a sound muffling or absorbing sheet for water supply and drainage pipes.

Among these applications, the impact absorber of the present embodiment, which is a crosslinked foam, is suited for use as a footwear material, particularly sole material of footwear and the like.

EXAMPLES

The present invention is described in further detail below with reference to the Measurement Examples, practical Examples of the invention and Comparative Examples, but it is to be understood that the present invention is not limited to these examples.

[Measurement Methods]
A) Determination of Characteristics and Physical Properties of the Polymer The characteristics and physical properties of the polymer were determined in the following way.
1) Styrene Content, Amount of Vinyl Bonds of Conjugated Diene, and Hydrogenation Ratio of Double Bonds Based on Conjugated Diene Compound The amounts of aromatic vinyl monomer units, 1,4-bond units and 1,2-bond units of butadiene, and ethylene units or butylenes units were determined by nuclear magnetic resonance (NMR) spectral analysis. Determinations were made by JNM-LA400 (trade name, mfd. by JEOL) using deuterated chloroform as solvent under the following conditions: sample concentration=50 mg/ml; observation frequency=400 MHz; chemical sift standard=TMS (tetramethylsilane); pulse delay=2.904 sec.; number of times of scanning=64; pulse width=45°; and determination temperature=26° C.

2) Determination of Polystyrene Block Content

Using a pre-hydrogenation copolymer, its polystyrene block content was measured by the osmium tetraoxide method shown in I. M. Kolthoff et al., J. Polym. Sci, 1, 429 (1946). For the decomposition of the copolymer, a 0.1 g/125 ml tertiary butanol solution of osmic acid was used.

3) Determination of Weight-Average Molecular Weight and Molecular Weight Distribution In the present invention, the weight-average molecular weight of the copolymer and its molecular weight distribution were determined from the polystyrene-reduced molecular weight using commercial standard polystyrene by gel permeation chromatography (GPC) (LC-10, trade name, mfd. by Shimadzu Corp.; column: TSKgelGMHXL (4.6 mmID×30 cm), two; solvent: tetrahydrofuran). The molecular weight distribution was determined as a ratio of the obtained weight-average molecular weight to the number-average molecular weight.

4) Determination of Coupling Ratio

The coupling ratio was determined from the peak area of GPC-determined molecular weight distribution before coupling and its peak area after coupling.

B) Preparation of Hydrogenation Catalyst

The hydrogenation catalyst I used for the hydrogenation reaction was prepared by the following method.

To a nitrogen-replaced reaction vessel, 1 L of dried and purified cyclohexane was supplied, to which 100 mmol of bis(η5-cyclopentadienyl)titanium dichloride was added, and then an n-hexane solution containing 200 mmol of trimethylaluminum was further added with sufficient stirring to carry out reaction at room temperature for about 3 days.

C) Preparation of Copolymers
<Polymer 1>

A block copolymer was prepared in the following way using a stirrer with an internal volume of 10 L and a jacketed tank type reactor.

A predetermined amount of cyclohexane was supplied to the reactor, and after adjusting the temperature to 70° C., n-butyllithium was supplied to the reactor from its bottom so that its amount would become 0.10 part by weight based on the weight of the whole monomers (total amount of a butadiene monomer and a styrene monomer supplied to the reactor). Further, a cyclohexane solution of N,N,N',N'-tetramethylethylenediamine was added so that the amount of N,N,N',N'-tetramethylethylenediamine would become 0.45 moles to 1 mole of n-butyllithium, and then a cyclohexane solution containing 17 parts by weight of styrene for the 1st step (monomer concentration: 24% by weight) was supplied as a monomer for a period of about 10 minutes, and the internal temperature of the reactor was adjusted to about 70° C. After stopping the supply, the reaction was further continued for 15 minutes while adjusting the internal temperature of the reactor at 70° C. Then a cyclohexane solution containing 42 parts by weight of butadiene and 41 parts by weight of styrene for the 2nd step (monomer concentration: 24% by weight) was supplied to the reactor continuously at a constant rate over a period of 60 minutes, during which period the internal temperature of the reactor was adjusted to stay at 70 to 80° C. After stopping the supply, the reaction was continued for 10 minutes while adjusting the internal temperature of the reactor at 70 to 80° C.

After the completion of polymerization, a cyclohexane solution of ethyl benzoate was added so that the amount of the bifunctional coupling agent ethyl benzoate would become 0.65 mole equivalent to 1 mole of n-butyllithium, allowing the reaction to carry on for 10 minutes with the internal temperature of the reactor being adjusted to 70° C. An analysis of the copolymer obtained from the batch coupling polymerization showed that the styrene content was 58% by weight, polystyrene block content was 19% by weight, amount of vinyl bonds of the butadiene moiety was 29%, coupling ratio was 65%, weight-average molecular weight was 180,000, and molecular weight distribution was 1.71. Then the hydrogenation catalyst I mentioned above was added to the copolymer obtained from the batch coupling polymerization in an amount of 100 ppm as titanium per 100 parts by weight of the non-hydrogenated copolymer, and the mixture was subjected to the hydrogenation reaction under a hydrogen pressure of 0.7 MPa at 65° C. On conclusion of the reaction, octadecyl-3-(3,5-di-tert-butyl-4-hydroxyphenyl) propionate was added as a stabilizer in an amount of 0.25 parts by weight per 100 parts by weight of the polymer to obtain a copolymer (polymer 1).

The hydrogenation ratio of the polymer 1 was 33%.

<Polymer 2>

The same procedure as in the case of preparation of the polymer 1 was carried out with 25 parts by weight of styrene for the 1st step and 38 parts by weight of butadiene and 37 parts by weight of styrene for the 2nd step by changing the amount of the monomers and the amounts of lithium and amine.

An analysis of the copolymer (polymer 2) obtained by the polymerization showed the following results: styrene content=62% by weight; polystyrene block content=27% by weight; amount of vinyl bonds of the butadiene moiety=31%; coupling ratio=64%; weight-average molecular weight=190,000; molecular weight distribution=1.75; hydrogenation ratio=38%.

<Polymer 3>

In the same procedure as in the preparation of the polymer 1, n-butyllithium was fed to the reactor from its bottom so that the amount of n-butyllithium would become 0.70 parts by weight based on the weight of the whole monomers, and then a cyclohexane solution of N,N,N',N'-tetramethylethylenediamine was supplied so that the amount of N,N,N',N'-tetramethylethylenediamine would become 0.4 mole per 1 mole of n-butyllithium. Thereafter, a cyclohexane solution containing 10 parts by weight of styrene for the 1st step was supplied as a monomer for about 5 minutes, and the internal temperature of the reactor was adjusted to about 70° C. After stopping the supply, the reaction was further continued for 15 minutes with the internal temperature of the reactor being adjusted to 70° C. Then a cyclohexane solution containing 17 parts by weight of butadiene and 10 parts by weight of styrene for the 2nd step was supplied to the reactor continuously at a constant rate over a period of 20 minutes, during which period the internal temperature of the reactor has been adjusted to stay at 70 to 80° C. After stopping the supply, the reaction was allowed to carry on for 5 minutes with the internal temperature of the reactor being controlled at 70 to 80° C. Further, a cyclohexane solution containing 20 parts by weight of butadiene and 35 parts by weight of styrene for the 3rd step was supplied to the reactor continuously at a constant rate over a period of 40 minutes, during which period the internal temperature of the reactor has been adjusted to remain at 70 to 80° C., and after stopping the supply, the reaction was further continued for 10 minutes while adjusting the internal temperature of the reactor at 70 to 80° C. Lastly, a cyclohexane solution containing 8 parts by weight of styrene for the 4th step was supplied for 5 minutes, adjusting the internal temperature of the reactor at about 70° C., and after stopping the supply, the reaction was further carried out for 15 minutes with the internal temperature of the reactor being adjusted at 70° C.

After the end of polymerization, a cyclohexane solution of methanol was added so that the amount of methanol was 1 equivalent to 1 mole of n-butyllithium to complete the polymerization reaction. An analysis of the copolymer obtained by the polymerization showed that this copolymer had a styrene content of 63% by weight, a polystyrene block content of 21% by weight, vinyl bonds of the butadiene moiety of 21%, a weight-average molecular weight of 160,000, and a molecular weight distribution of 1.05.

The obtained copolymer was subjected to a hydrogenation reaction in the same procedure as in the case of the polymer 1, and a stabilizer was added after the end of the reaction to obtain a copolymer (polymer 3).

The hydrogenation ratio of the polymer 3 was 36%.

<Polymer 4>

The same procedure of polymerization as in the preparation of the polymer 3 was carried out using 10 parts by weight of styrene for the 1st step, 14 parts by weight of butadiene and 14 parts by weight of styrene for the 2nd step, 22 parts by weight of butadiene and 32 parts by weight of styrene for the 3rd step, and 8 parts by weight of styrene for the 4th step, while changing the amount of the monomers and the amounts of lithium and amine.

Analyzing the copolymer (polymer 4) obtained by the polymerization, it was found that this copolymer had a styrene content of 64% by weight, a polystyrene block content of 23% by weight, an amount of vinyl bonds of the butadiene moiety of 19%, a weight-average molecular weight of 170,000, a molecular weight distribution of 1.06, and a hydrogenation ratio of 35%.

<Polymer 5>

Polymerization was carried out by the same procedure as in the preparation of the polymer 3 using 8 parts by weight of styrene for the 1st step, 16 parts by weight of butadiene and 13 parts by weight of styrene for the 2nd step, 26 parts by weight of butadiene and 30 parts by weight of styrene for the 3rd step and 7 parts by weight of styrene for the 4th step, while changing the amount of the monomers and the amounts of lithium and amine.

Analyzing the copolymer (polymer 5) obtained by the polymerization, this copolymer was found to have a styrene content of 58% by weight, a polystyrene block content of 19% by weight, an amount of vinyl bonds of the butadiene moiety of 21%, a weight-average molecular weight of 160,000, a molecular weight distribution of 1.05, and a hydrogenation ratio of 40%.

<Polymer 6>

Polymerization was carried out by the same procedure as in the preparation of the polymer 3 using 10 parts by weight of styrene for the 1st step, 18 parts by weight of butadiene and 10 parts by weight of styrene for the 2nd step, 18 parts by weight of butadiene and 36 parts by weight of styrene for the 3rd step and 8 parts by weight of styrene for the 4th step, while changing the amount of the monomers and the amounts of lithium and amine.

Analyzing the copolymer (polymer 6) obtained by the polymerization, this copolymer was found to have a styrene content of 64% by weight, a polystyrene block content of 22.5% by weight, an amount of vinyl bonds of the butadiene moiety of 20%, a weight-average molecular weight of 175,000, a molecular weight distribution of 1.07, and a hydrogenation ratio of 79%.

The compositions, structures and molecular weights of the obtained copolymers (polymers 1 to 6) are shown in Table 1.

TABLE 1

| Composition, structure and molecular weight of polymer | Polymer 1 | 2 | 3 | 4 | 5 | 6 |
|---|---|---|---|---|---|---|
| Styrene content in polymer (wt %) | 58 | 62 | 63 | 64 | 58 | 64 |
| Styrene block content in polymer (wt %) | 19 | 27 | 21 | 23 | 19 | 22.5 |
| Vinyl content in conjugated diene (%) | 29 | 31 | 21 | 19 | 21 | 20 |
| Coupling ratio (%) | 65 | 64 | — | — | — | — |
| Weight-average molecular weight (unit: 10,000) | 18 | 19 | 16 | 17 | 16 | 17.5 |
| Molecular weight distribution (weight-average molecular weight/number-average molecular weight) | 1.71 | 1.75 | 1.05 | 1.06 | 1.05 | 1.07 |
| Ratio of hydrogenation to double bonds in conjugated diene (%) | 33 | 38 | 36 | 35 | 40 | 79 |
| tan δ peak temperature (° C.) | 3.9 | 2.1 | 8.5 | 5.1 | −4.1 | 18.1 |
| Value of tan δ at 15° C. | 0.61 | 0.43 | 0.68 | 0.65 | 0.34 | 0.69 |
| Temperature range where the value of tan δ is 0.4 or more (° C.) | −6.5~19.5 | −5.5~16 | −4~24 | −5.5~21.5 | −13~12.5 | 9~29.5 |
| Temperature range where the value of tan δ is 0.5 or more (° C.) | −5~19 | −4.5~13 | −1~20 | −4~18 | −12~10 | 11~26 |

<Polymer 7>

Ethylene copolymer: EXACT5101 (product by Exxon Mobil Corp.)

D) Production of Crosslinked Foam which is an Impact Absorber

Using a kneader as a melt mixer, the formulation components for the first step shown in Table 2 were kneaded at 110 to 120° C. for 15 minutes. Then using a two-roll open mill as a melt mixer, the mixture of the first step and the formulation components for the second step shown in Table 2 were kneaded at about 90 to 100° C. for 10 minutes.

Then the obtained mixture was compression molded under a pressure of 150 kgf/cm² at 160° C. for 20 minutes using a compression molding machine, and then the pressure was released to obtain a crosslinked molded product or a crosslinked and foamed molded product of a polymer composition.

E) Determination of Characteristic Properties of Crosslinked Molded Product and Crosslinked and Foamed Molded Product 1) Low-Temperature Hardening Resistance Hardness of the crosslinked foam samples at 22° C. and −5° C. was measured by an Asker C type durometer according to ASTM-D2240. The smaller the variation of hardness, the better. The products with a durometer hardness of 20° or more were rated good (marked with ○) and the products with a durometer hardness of more than 20° were rated poor (marked with X).

2) Compression Set

Each crosslinked foam sample was cut to a 1 cm thick piece, and a compression set test was conducted on it according to JIS-K6262 under the measuring conditions of 50° C., 50% compression and 6 hours.

3) Peel Strength

Each crosslinked foam sample was cut to a 1 cm thick and 2 cm wide piece, and after forming a notch at a central portion of thickness, the piece was peeled at a rate of 100 mm/min.

Peel strength=Maximum measured peel strength/2(N/cm)

4) Impact Resilience

Using the test pieces having a thickness in the range of 15 to 17 mm, a steel-made ball (16.3 g) was dropped onto these test pieces, and their impact resilience was determined from the following formula. The testing temperature was 22° C. The smaller the numerical value of impact resilience, the better the absorption properties. The products with impact resilience of less than 15% were rated acceptable.

Impact resilience (%)=[$HR/H0$]×100

H0=height of drop of the ball
HR=height of repulsion of the ball

TABLE 2

| | | Formulation components | | Example 1 | 2 | 3 | 4 |
|---|---|---|---|---|---|---|---|
| First step | Polymer | Hydrogenated copolymer | Polymer 1 | 100 | | | |
| | | | Polymer 3 | | 100 | 80 | |
| | | | Polymer 4 | | | | 100 |
| | | | Polymer 2 | | | | |
| | | | Polymer 5 | | | | |
| | | | Polymer 6 | | | | |
| | | Ethylene copolymer | Polymer 7 | | | 20 | |
| | Additives | Zinc oxide | | 1.5 | 1.5 | 1.5 | 1.5 |
| | | Stearic acid | | 0.4 | 0.4 | 0.4 | 0.4 |
| | | Talc | | 10 | 10 | 10 | 10 |
| | | Titanium oxide | | 2 | 2 | 2 | 2 |
| | | Zinc stearate | | 0.8 | 0.8 | 0.8 | 0.8 |
| Second step | Additives | Dicumyl peroxide (crosslinking agent) | | 0.5 | 0.5 | 0.5 | 0.5 |
| | | Azodicarboxylic amide (foaming agent) | | 2.0   2.5 | 2.0   2.5 | 2.5 | 2.0   2.5 |

TABLE 2-continued

| Physical properties | | | | | | | | |
|---|---|---|---|---|---|---|---|---|
| Specific gravity (g/cc) | 0.403 | 0.297 | 0.399 | 0.306 | 0.332 | 0.406 | 0.299 |
| Hardness at 22° C. (AsKer C) | 41 | 34 | 48 | 39 | 50 | 46 | 37 |
| Compression set: 50% compression × 50° C. × 6 hr | 34 | 31 | 33 | 33 | 29 | 39 | 38 |
| Peel strength (N/cm) | 25 | 20 | 27 | 22 | 31 | 28 | 22 |
| Low-temperature hardening resistance | ○ | ○ | ○ | ○ | ○ | ○ | ○ |
| Impact resilience (%) | 12 | 13 | 10 | 10 | 12 | 10-11 | 11 |

| | | | | Comparative Example | | |
|---|---|---|---|---|---|---|
| Formulation components | | | | 1 | 2 | 3 |
| First step | Polymer | Hydrogenated copolymer | Polymer 1 | | | |
| | | | Polymer 3 | | | |
| | | | Polymer 4 | | | |
| | | | Polymer 2 | 100 | | |
| | | | Polymer 5 | | 100 | |
| | | | Polymer 6 | | | 100 |
| | | Ethylene copolymer | Polymer 7 | | | |
| | Additives | Zinc oxide | | 1.5 | 1.5 | 1.5 |
| | | Stearic acid | | 0.4 | 0.4 | 0.4 |
| | | Talc | | 10 | 10 | 10 |
| | | Titanium oxide | | 2 | 2 | 2 |
| | | Zinc stearate | | 0.8 | 0.8 | 0.8 |
| Second step | Additives | Dicumyl peroxide (crosslinking agent) | | 0.5 | 0.5 | 0.5 |
| | | Azodicarboxylic amide (foaming agent) | | 2.0 2.5 | 2.0 2.5 | 2.0 2.5 |
| Physical properties | | Specific gravity (g/cc) | | 0.401 0.300 | 0.398 0.302 | 0.400 0.298 |
| | | Hardness at 22° C. (AsKer C) | | 45 37 | 43 36 | 49 41 |
| | | Compression set: 50% compression × 50° C. × 6 hr | | 36 35 | 30 29 | 44 43 |
| | | Peel strength (N/cm) | | 28 23 | 26 21 | 28 23 |
| | | Low-temperature hardening resistance | | ○ ○ | ○ ○ | X X |
| | | Impact resilience (%) | | 15 17 | 17 20 | 10 10 |

From the results shown in Table 2, it is seen that the impact absorber compositions of Examples 1 to 4, which contain a copolymer where the peak of tan δ obtained from measurement of dynamic viscoelasticity is within the range from more than 0° C. to 20° C. or less, the value of tan δ is 0.4 or more in the whole temperature range from 5° C. to 15° C., and the value of tan δ at 15° C. is 0.5 or more, are excellent in all of the required properties, namely, lightweightness, low-temperature hardening resistance and low impact resilience (impact absorption properties).

Particularly, the results shown in Examples 2 to 4 endorse the fact that low-temperature hardening resistance and low impact resilience (impact absorption properties) of the impact absorber compositions can be further improved by using a copolymer obtained from a process comprising a step of polymerizing the copolymer block (S) in which an aromatic vinyl compound and a conjugated diene are supplied to a polymerization tank and polymerized as a monomeric mixture (M1) having a content of aromatic vinyl compound of 25 to 55% by weight, and a step in which a monomeric mixture (M2) differing from the composition of M1 and having a content of aromatic vinyl compound of 55 to 80% by weight is supplied to the polymerization tank and polymerized.

INDUSTRIAL APPLICABILITY

According to the present invention, there is provided an impact absorber composition which comprises a copolymer (or an olefinic copolymer as required) containing an aromatic vinyl compound, and which excels in all of the requisite properties, namely, lightweightness, low-temperature hardening resistance and low impact resilience (impact absorption properties), by using a copolymer of which the value of tan δ at a specific temperature and the tan δ peak temperature are controlled to stay in the specified ranges. Particularly, the impact absorber composition of the present invention has high potential of industrial utilization as footwear material, especially sole material for footwear.

The invention claimed is:

1. An impact absorber composition comprising a copolymer containing an aromatic vinyl compound, wherein a tan δ peak determined from a measurement of dynamic viscoelasticity (at 1 Hz) of the copolymer is in a range from more than 0° C. to 20° C. or less, a tan δ value of the copolymer is 0.4 or more in a whole temperature range of 5° C. to 15° C., the tan δ value of the copolymer at 15° C. is 0.5 or more, and content of the aromatic vinyl compound in the copolymer containing the aromatic vinyl compound is more than 50% by weight.

2. The impact absorber composition according to claim 1, wherein the copolymer containing the aromatic vinyl compound is a copolymer (which may have been hydrogenated) composed principally of an aromatic vinyl compound and a conjugated diene, and/or a copolymer composed principally of an aromatic vinyl compound and alkylene.

3. The impact absorber composition according to claim 1 or 2, wherein the tan δ peak determined from the measurement of dynamic viscoelasticity (at 1 Hz) of the copolymer containing the aromatic vinyl compound is in a range of 2° C. to 15° C., and the tan δ value of the copolymer at 15° C. is 0.55 or more.

4. The impact absorber composition according to claim 1 or 2, wherein the tan δ value determined from the measurement of dynamic viscoelasticity (at 1 Hz) of the copolymer containing the aromatic vinyl compound is 0.5 or more in the whole temperature range of 5° C. to 15° C.

5. The impact absorber composition according to claim 1 or 2, wherein a modulus of rigidity G' at −5° C. determined from the measurement of dynamic viscoelasticity (at 1 Hz) of the copolymer containing the aromatic vinyl compound is 500 MPa or less, and the modulus of rigidity G' at 40° C. is 4 MPa or less.

6. The impact absorber composition according to claim 2, wherein a ratio of hydrogenation to the double bonds based on a pre-hydrogenation conjugated diene compound in the copolymer containing the aromatic vinyl compound is 5% or more to 97% or less.

7. The impact absorber composition according to claim 2, wherein the ratio of hydrogenation to the double bonds based on the pre-hydrogenation conjugated diene compound in the copolymer containing the aromatic vinyl compound is 10% or more to 70% or less.

8. The impact absorber composition according to claim 1 or 2, wherein a weight-average molecular weight of the copolymer containing the aromatic vinyl compound is 50,000 or more to 500,000 or less.

9. The impact absorber composition according to claim 1 or 2, wherein the copolymer containing the aromatic vinyl compound comprises at least a copolymer block composed principally of alkylene and an aromatic vinyl compound, and/or a copolymer block (S) composed principally of a conjugated diene and an aromatic vinyl compound.

10. The impact absorber composition according to claim 9, wherein a content of vinyl derived from the pre-hydrogenation conjugated diene in the copolymer block (S), or an amount of α-olefin having 3 or more carbon atoms derived from alkylene is in a range of 5% or more to 60% or less.

11. The impact absorber composition according to claim 9, wherein the copolymer block (S) comprises a copolymer composed principally of a conjugated diene and an aromatic vinyl compound and has two or more segments differing in content of the aromatic vinyl compound, and a difference in content of the aromatic vinyl compound between any two segments is 5% by weight or more.

12. The impact absorber composition according to claim 11, wherein the copolymer block (S) contains two adjoining segments differing in content of aromatic vinyl compound by 5% by weight or more.

13. The impact absorber composition according to claim 11 or 12, wherein the segments differing in the content of the aromatic vinyl compound comprise a segment (S1) of a monomeric composition having an aromatic vinyl compound content of 25 to 55% by weight, and a segment (S2) of a monomeric composition having an aromatic vinyl compound content of 55 to 80% by weight, and amounts of the segments S1 and S2 are each 30% by weight or more based on the copolymer block (S).

14. A process for producing a copolymer containing an aromatic vinyl compound by anionic polymerization, which comprises:

a step of polymerizing a copolymer block (S) composed principally of an aromatic vinyl compound and a conjugated diene, wherein the step of polymerizing the copolymer block (S) is carried out by supplying the aromatic vinyl compound and the conjugated diene to a polymerization tank for polymerization by changing a ratio of the aromatic vinyl compound to the conjugated diene, or by portioning a monomeric mixture differing in a ratio of the aromatic vinyl compound to the conjugated diene in two or more stages.

15. The process for producing a copolymer containing an aromatic vinyl compound according to claim 14, wherein the step of polymerizing the copolymer block (S) comprises a step of supplying the aromatic vinyl compound and the conjugated diene to a polymerization tank as a monomeric mixture (M1) having the aromatic vinyl compound content of 25 to 55% by weight for polymerization, and a step of supplying the aromatic vinyl compound and the conjugated diene to a polymerization tank as a monomeric mixture (M2) which differs in composition from the M1 and has an aromatic vinyl compound content of 55 to 80% by weight for polymerization.

16. The process for producing a copolymer containing an aromatic vinyl compound according to claim 15, wherein a difference in the aromatic vinyl compound content between the monomeric mixture (M1) and the monomeric mixture (M2) is 5 by weight or more to 30% by weight or less.

17. The impact absorber composition according to claim 1 or 2, which comprises the copolymer containing the aromatic vinyl compound and a thermoplastic resin other than the copolymer containing the aromatic vinyl compound, wherein a ratio by weight of the copolymer containing the aromatic vinyl compound to the thermoplastic resin is 95/5 to 5/95.

18. The impact absorber composition according to claim 17, wherein the thermoplastic resin is a copolymer containing ethylene.

19. The impact absorber composition according to claim 18, comprising the copolymer containing the aromatic vinyl compound, a thermoplastic resin containing 50% by weight or more of ethylene or an olefinic thermoplastic elastomer, and an inorganic filler.

20. The impact absorber composition according to claim 1 or 2, further comprising a foaming agent.

21. The impact absorber composition according to claim 1 or 2, further comprising a crosslinking agent.

22. The impact absorber composition according to claim 1 or 2, which has a specific gravity of 0.28 or more to 0.35 or less, a hardness at 22° C. of 47° or more to 53° or less, an impact resilience of 14% or less, and a peel strength of 27 N/cm or more.

23. A footwear using the impact absorber composition according to claim 1 or 2.

24. A laminate obtained by laminating the impact absorber composition according to claim 1 or 2 to a plywood.

* * * * *